United States Patent [19]

Lori

[11] Patent Number: 4,622,237

[45] Date of Patent: Nov. 11, 1986

[54] METHOD OF FLAME ACTIVATION OF SUBSTRATES

[76] Inventor: Giulio Lori, Via Lambruschini, 4-Terni, Italy

[21] Appl. No.: 743,692

[22] Filed: Jun. 11, 1985

[30] Foreign Application Priority Data

Jun. 22, 1984 [IT] Italy ............................... 66706 A/84

[51] Int. Cl.$^4$ ................................................. B05D 3/06
[52] U.S. Cl. ...................................... 427/40; 427/223; 204/165
[58] Field of Search ..................... 427/38, 39, 40, 223; 204/164, 165

[56] References Cited

U.S. PATENT DOCUMENTS

| | | | |
|---|---|---|---|
| 3,317,339 | 5/1967 | Fortner et al. | 427/223 |
| 3,361,587 | 1/1968 | Menikheim et al. | 427/40 |
| 3,364,056 | 1/1968 | Seibel | 427/223 |
| 3,823,061 | 7/1974 | Frayer et al. | 427/40 |
| 3,839,743 | 10/1974 | Schwarcz | 623/1 |
| 3,914,521 | 10/1975 | Beatty et al. | 427/40 |
| 4,197,129 | 4/1980 | Muroi et al. | 427/40 |
| 4,422,907 | 12/1983 | Birkmaier et al. | 427/40 |
| 4,468,412 | 8/1984 | Fujii et al. | 427/40 |

*Primary Examiner*—John H. Newsome
*Attorney, Agent, or Firm*—Robert E. Burns; Emmanuel J. Lobato; Bruce L. Adams

[57] ABSTRACT

Physical method for the treatment of the surfaces of polyolefinic plastic laminates, polytetrafluoroethylene (PTFE), cardboards and metal sheets such as, particularly, aluminium and tinplate, of any thicknesses and widths, by means of a flame produced by the combustion of a mixture of air-hydrocarbon gas, characterized in that such a mixture is enriched with pure oxygen gas.

16 Claims, No Drawings

METHOD OF FLAME ACTIVATION OF SUBSTRATES

It is known that among the processing operations which the plastic films undergo in the various applications fields, the most important ones are the printing, the coatings by laquering or by extrusion-coating and the lamination, i.e., the coupling by means of adhesives with other flexible sheets (such as paper, cardboard, aluminum or other films).

In all these cases, it is necessary to accomplish a strong adhesion between the film and the layer which one desires to couple therewith. In some cases, to the adhesion a mechanical component contributes, but more often it is a matter of an adhesion of chemical-physical nature, due to the intermolecular attractive forces between the two materials. Without entering into the details of the complex phenomena relating to the adhesion, it is known that to the purpose of improving the adhesion forces between a solid material and a liquid material, it is necessary to prepare the surface of the solid by removing the contaminating agents therefrom and increasing its surface energy.

The methods which are presently used to the purpose of obtaining this energy increase are:

chemical treatments—not much used—consisting in passing the materials to be treated through liquids which oxidize the surface thereof or produce a microporosity.

physical treatments, among which the most known are two: corona discharge treatment, and flame-exposure.

In the corona treatment the surface to be treated is passed through the air-gap comprised between the electrode fed by a radio-freqeuncy medium-voltage electric current and the supporting roller, also known as the treatment roller, electrically grounded, coated by means of an insulating sheath.

In this air-gap an effluve discharge system is established which determines the surface treatment. A ionization of air molecules occurs, which increases so as to cause the so-called dielectric breakdown of the air. The kinetic energy of the ions is transformed into thermal energy, which heats the air-gap, the material to be treated and the insulating coating of the roller.

In particular, the heating reduces the life of the insulating coating whose duties are many and not always fulfilled by a single material.

This indeed must be compact and free from inner cavities in order not to yield under the corona effect, nust have a high dielectric strength in order not to be easily broken down, a high resistance to ozone in order not to undergo degradation with time and low dielectric losses in order not to get too hot.

On corona treatment, often the reverse side treatment occurs, when the surface to be treated does not adhere intimately to the supporting roller due to the presence of folds, wrinkles, inadequate pull, roughness of the dielectric coating, etc.; under such condition, an—often undesired—treatment level occurs also on the face opposite to the one being treated. Notwithstanding these limitations, the treatment by corona discharge is widely adopted especially on plants of small width and for low operating rates, in that the related power values are small.

However, it should not be underevaluated the usual caution which the process imposes to the operator, due to the problems placed by the elimination both of the severe corrosive effect of the ozone and of the radiofrequency radiation, without infringing the most elementary ecological principles. In the flame treatment—covered by Patent No. 1033601 Aug. 10, 1979 to the same Applicant—the surface to be treated is lapped by the ozidizer region of the flame obtained by means of the combustion of a mixture of air and hydrocarbon gas supplied by a suitable generator. The flame reaches in its oxidizer region a temperature of about 1600° C. As this temperature has shown to be insufficient for the treatment of some non polar plastic materials, such as polytetrafluoroethylenes, having much lower surface energies than the commercial inks and/or adhesives, a flame treatment method has been investigated and set up to the purpose of getting rid of this limitation. The treatment phenomenon, especially on thermoplastic films, is a pyrolysis process interesting a layer of 500–1000 Å in depth; the materials of higher molecular weight present on the surface exposed to the flame are decomposed before being vapourized.

The decomposition is an endothermic process wherein the high bond energies, which range from 200 to 400 kJ/mol, must be exceeded by the corresponding activation energies. In many cases the decomposition proceeds through chian reactions of free radicals, caused by oxygen present in the flame. The oxidative degradation goes onward through the formation of hydroperoxide groups, whose decompositions leads to the chain branching and hence to such highly reactive products, as H and OH free radicals. The higher the flame temperature, the more violent and quick the reaching of the splitting of the bonds of surface molecules and the formation of high-energy free radicals. In particular, the formation of high-energy free radicals during the thermal oxidation of polyolefins has been demonstrated by several Authors.

SUMMARY OF THE INVENTION

The object of the present invention is a method allowing the treatment, or, as they usually say, the surface activation by means of:

(1) an electrically-excited oxidizer flame;

(2) an oxidizer flame enriched with oxygen;

(3) an oxidizer flame enriched with oxygen and electrically excited.

(4) an electrically excited oxidizer flame with the addition of traces of alkaline and alkaline-earth metals;

(5) an electrically excited oxidizer flame with the addition of steam.

DESCRIPTION OF THE PREFERRED EMBODIMENTS

The new system, anyhow by means of a flame, is based on the excitation of said flame by means of a direct voltage which increases the ionization of ordinary and radicalic substances of the components of the combustion.

The splitting of the bonds of the molecules of the material to be treated and the formation of high-energy free radicals is made easier by an increase in flame ionization, which is, as it is well known, an extremely good electrical conductor. In fact if two metal electrodes are immersed in the region immediately following the reaction zone and to them a potential difference is applied, it is possible to extract a weak electrical current from hot gases.

The following equation:

$$E=(aA/d)\cdot i+(a\cdot B)\cdot i^2$$

wherein:
E = potential difference;
a = electrode surface area;
A = constant representing the value of specific resistance of the flame (about $10^{-6}\Omega\cdot cm^{-1}$);
d = distance between the electrodes;
B = electrode characteristic constant ($\Omega\cdot cm^{-2}\cdot amp^{-1}$)
i = current intensity;
gives the law regulating the electrical behaviour of the flame.

The first term of the equation is a measure of the potential difference across the gas mass; due to the mass difference between the ions and the electrons, the current is supported by about 99% by these latter and by 1% only by the ions. The quadratic term gives the potential drop in the nearby of the electrodes; the greatest part of this drop is to be assigned to the negative electrode. By connecting the body of the burner to a pole and the roller lapped by the flame to the other pole of a D.C. generator, the burner-roller assembly behaves as a diode with high internal resistance. The electrical direct current flowing through the flame is the result of the occurred ionization.

If the polarities of the burner-roller assembly are inverted, a different value of ionic conduction is obtained. The treatment level is therefore reduced by at least 2 units (dyn/cm), whilst by switching off the voltage supply to the system, the treatment is reduced by about 4 units. For the measurement of the wettability of a laminate or film, the method provided by ASTM Standards, which is the most diffused one, is used.

This method involves the use of a series of liquids of known surface tension. Starting from the highest surface tension, a thin layer of liquid is applied onto the surface of the laminate or film; if such a layer is immediately destroyed into small droplets, the liquid with lower surface tension is applied, and so forth, until the liquid is reached whose layer remains continue for at least two seconds.

The surface tension of this latter liquid corresponds to the wettability tension of the laminate or film being tested. The characteristics of the liquid and the operating ways are described by ASTM D 2578 Standard.

Going back to the mechanism of flame electrical conductivity, the ionized atoms of the species produced by the combustion, accelerated by the applied electrical field, hit the laminate with sufficient energy to split the C—H bonds of the surface molecules. In the activation process by means of oxygen addition, the thermodynamic and fluid-mechanical profile of the flame results to be notably modified as a function of the added oxygen amount.

The temperature of the flame depends on the thermal balance between the heat produced in the combustion reactions and that transferred to the components developed during the combustion (nitrogen, carbon dioxide and water): by burning the fuel in the theoretical amount of air, the temperature obtained is not higher than 1600° C., in that there are the 4/5 of inert nitrogen which are to be heated. It is enough to modify the composition of the air-hydrocarbons mixture by means of an adequate addition of oxygen, to increase the temperature of the flame. With an enrichment in oxygen of 5% by volume, an increase of the treatment of 2 points (2 dyn/cm) is obtained. The mixing of air-oxygen-hydrocarbon must take place in an homogeneous fashion, to make it then possible the achievement of a uniform and constant flame.

Into the Venturi mixer together with air and hydrocarbon gas also oxygen is fed, dosed and regulated relatively to the desired enrichment and measured by means of a flowmeter. A suitable detector device checks continuously the calorific value of the mixture obtained, automatically correcting the amount of hydrocarbon to be mixed to oxygen-enriched air, to the purpose of holding constant the calorific value of the same mixture. The whole system is completed by efficient and appropriate safety systems, in compliance with the law regulations presently in force thereupon, as well as according to the good technical rules used in the field of industrial combustions.

Also other substances, introduced into the gas mixture before the combustion, modify the surface treatment of the plastic laminates or films to a great extent. Tests carried out on different materials have always confirmed the trend towards better results than obtained by means of normal flames. An amount of 5% by weight of steam injected into the mixture improves the treatment by 2 points: some substances such as alkaline or alkaline-earth metals improve it to a higher extent.

The presence of a few parts per million of alkaline metals improves the treatment by 2 points, whilst with a flame electrically excited and made conductive by means of the use of potassium chloride (introduced in trace amounts into the flame) the improvement is of 5 points.

The Examples reported are illustrative and not limitative of the invention.

As the flames accomplished by means of different techniques and methods lead unequivocally to:

higher temperature, and hence better heat transmission coefficients than normal flames;
increases in gas thermal conductivity;
great activity of ionized species;
it can be concluded that the treating effect of a flame follows the enthalpy and hence the temperature thereof.

I claim:

1. A method of treatment of surfaces of objects made of plastic materials, resins, rubbers, papers, cardboards or metals comprising, treating said surfaces with an electrically excited flame of a burning gaseous mixture.

2. A method of treatment of the surfaces of objects made of plastic materials, resins, rubbers, papers, cardboards or metal according to claim 1, in which the burning gaseous mixture flame is excited by direct current.

3. A method of treatment of the surfaces of objects made of plastic materials, resins, rubbers, papers, cardboards or metal according to claim 1, in which the gaseous mixture is composed of an air-hydrocarbon gas.

4. A method of treatment of the surfaces of objects made of plastic materials, resins, rubbers, papers, cardboards or metal according to claim 1, in which the gaseous mixture is enriched with pure oxygen gas.

5. A method of treatment of the surfaces of objects made of plastic materials, resins, rubbers, papers, cardboards or metals according to claim 1, in which the gaseous mixture is enriched with pure oxygen gas in a Ventrui mixer.

6. A method of treatment of the surfaces of objects made of plastic materials, resins, rubbers, papers, cardboards or metals according to claim 1, including constantly checking the flame with an analyzer of thermal power.

7. A method of treatment of the surfaces of objects made of plastic materials, resins, rubbers, papers, cardboards or metals according to claim 1, including injecting steam into the gaseous mixture.

8. A method of treatment of the surfaces of objects made of plastic materials, resins, rubbers, papers, cardboards or metals according to claim 1, including introducing traces of alkaline and alkaline-earth metals into said gaseous mixture.

9. A method of treatment of the surfaces of objects made of plastic materials, resins, rubbers, papers, cardboards or metals according to claim 1, in which said objects are films, sheets, plates, coextruded laminates, expanded materials, corrugated, interwoven, tissued and non-tissued, of any thickness, width and length.

10. A method of treatment of the surfaces of objects made of plastic materials, resins, rubbers, papers, cardboards or metals according to claim 1, in which said plastic materials are polyoleofins.

11. A method of treatment of the surfaces of objects made of plastic materials, resins, rubbers, papers, cardboards, or metals according to claim 10, in which said polyoleofine are polypropylene and polyethylene.

12. A method of treatement of the surfaces of objects made of plastic materials, resins, rubbers, papers, cardboards or metals according to claim 1 in which said plastic materials are fluorinated polymers.

13. A method of treatment of the surfaces of objects made of plastic materials, resins, rubbers, papers, cardboards or metals according to claim 12 in which said fluorinated polymers are made of TEFLON(PTFE).

14. A method of treatment of the surfaces of objects made of plastic materials, resins, rubbers, papers, cardboards or metals according to claim 1, in which said metals are aluminum and tin.

15. A method of treatment of the surfaces of objects made of plastic materials, resins, rubbers, papers, cardboards or metals according to claim 1, in which said objects are latten.

16. A method of treatment of the surface of objects made of plastic materials, resins, rubbers, papers, cardboards or metals according to claim 1, in which said objects are expanded polypropylene and polyethylene films.

* * * * *